(12) United States Patent
Gielda et al.

(10) Patent No.: US 9,279,234 B1
(45) Date of Patent: Mar. 8, 2016

(54) DOOR SYSTEM FOR A MACHINE

(71) Applicant: Caterpillar Inc., Peoria, IL (US)

(72) Inventors: Matthew James Gielda, Peoria, IL (US); Ryan Barry Hausauer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/626,950

(22) Filed: Feb. 20, 2015

(51) Int. Cl.
B60J 5/00 (2006.01)
E02F 9/16 (2006.01)
B60J 5/04 (2006.01)
B60J 10/00 (2006.01)
E05B 83/00 (2014.01)

(52) U.S. Cl.
CPC .............. *E02F 9/163* (2013.01); *B60J 5/0402* (2013.01); *B60J 5/0408* (2013.01); *B60J 10/0065* (2013.01); *E05B 83/00* (2013.01)

(58) Field of Classification Search
CPC .................................. B60J 5/00; B60J 5/107
USPC ......... 296/146.5, 190.1, 190.11; 49/501, 503, 49/504
See application file for complete search history.

(56) References Cited

U.S. PATENT DOCUMENTS

| 4,605,259 A * | 8/1986 | Hurlburt ............ B62D 33/0617 296/190.08 |
| 6,776,449 B2 | 8/2004 | Komatsu et al. | |
| 6,814,393 B2 * | 11/2004 | Nagata ................. B60J 10/0031 296/146.5 |
| 8,556,329 B2 | 10/2013 | Uto | |
| 2013/0169002 A1 | 7/2013 | Moebius | |

FOREIGN PATENT DOCUMENTS

EP 2799265 11/2014

* cited by examiner

Primary Examiner — Dennis H Pedder

(57) ABSTRACT

A door system includes a window and a door frame. The door frame includes a first panel and a second panel. The first panel includes a first outer portion and a second outer portion. The first outer portion has a first outer leg, an intermediate portion, and a second outer leg that together define a cavity. The second panel has a first inner portion, a lip portion and a second inner portion. The first inner portion is joined to the second outer portion of the first panel. The second inner portion has a first inner leg and a second inner leg that together define a seal channel wall extending within the cavity. The lip portion includes an offset portion extending in a direction opposite to that of the seal channel wall.

20 Claims, 8 Drawing Sheets

DOOR SYSTEM FOR A MACHINE

TECHNICAL FIELD

The present disclosure relates to a door system and more specifically, the present disclosure relates to a door system for a machine.

BACKGROUND

Doors are typically subject to loads arising from latching and unlatching against a frame. For example, doors employed on machines are often opened and closed relative to a frame of the machine, during which, the door may undergo a twisting moment each time a latch present on the door is latched to or unlatched from the frame of the machine. Many previously known configurations of door panels have been known to undergo such twisting moment with latching of the door to the frame.

Manufacturers of door assemblies have been constantly directing efforts to improve the overall strength of doors so as to allow the doors to withstand twisting moments and/or other types of operational loads encountered during latching of the door. For reference, U.S. Pat. No. 8,556,329 discloses a door panel that has a double-panel structure and that is capable of ensuring sufficient strength at portions where hinges are attached.

SUMMARY OF THE DISCLOSURE

In one aspect of the present disclosure, a door system for a machine includes a window and a door frame surrounding the window. The door frame includes a first panel and a second panel that is coupled to the first panel. The first panel includes a first outer portion and a second outer portion that is coupled to the first outer portion. Further, the first outer portion has a first outer leg, an intermediate portion, and a second outer leg that together define a cavity having a U-shape with a width about a first axis. The first outer leg is disposed closer in proximity to the window than the second outer leg. The second outer portion extends from the first outer leg toward the window and about a second axis that is perpendicular to the first axis.

The second panel has a first inner portion, a lip portion and a second inner portion that are coupled to one another. The first inner portion is joined to the second outer portion of the first panel at a first coupling such that the first coupling extends about the second axis. The second inner portion has a first inner leg that extends from the lip portion, and a second inner leg that is coupled to the second outer leg of the first panel at a second coupling in a direction substantially about the first axis. The first inner leg and the second inner leg together define a seal channel wall that extends within the cavity. The lip portion of the second panel includes an offset portion that is configured to extend away from the second axis and in a direction opposite to the direction of the seal channel wall.

In another aspect of the present disclosure, the door system includes a latch bracket that is coupled to the door frame. The second outer leg of the first outer portion of the first panel has two slanted sides that are located in the vicinity of the latch bracket. Moreover, the slanted sides are converging distally away from the first outer leg of the first panel.

Embodiments of the present disclosure are also directed to a machine including a cabin having a cabin frame, and employing the door system disclosed herein. The door system is coupled to the cabin frame.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
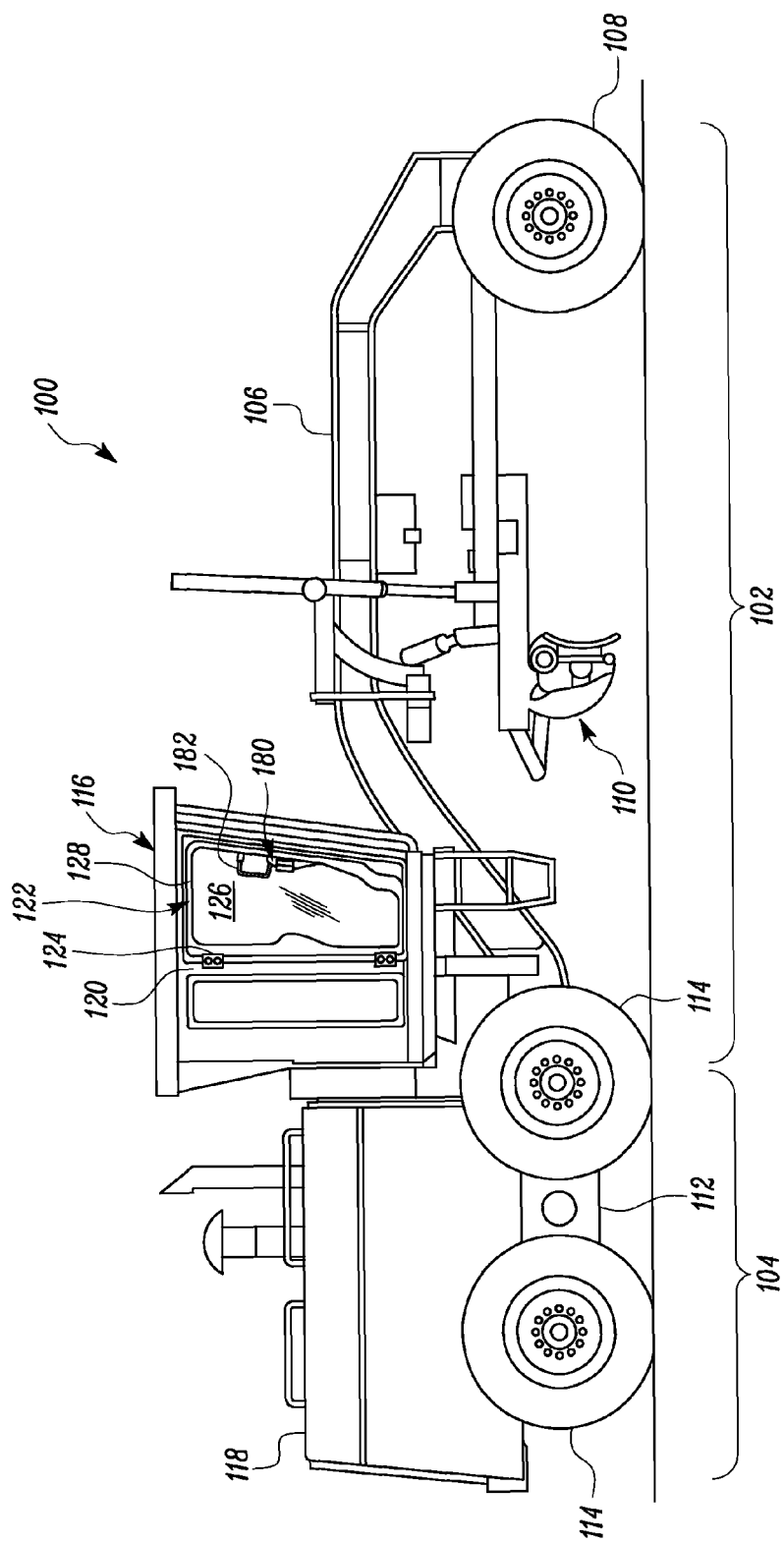
FIG. 1 is a side view of an exemplary machine employing a door system, in accordance with an embodiment of the present disclosure.

FIG. 1 illustrates an exemplary machine 100. The machine 100 depicted in FIG. 1 is a motor grader. However, the machine 100 could alternatively be embodied in the form of a track-type tractor, a hydraulic excavator, a wheel loader, a haul truck, a large mining truck, an off-highway truck, an on-highway truck, and other types of industrial or commercial vehicles. Further, it may be noted that the machine 100 may also be embodied in the form of any wheeled or tracked type of machine that is associated with mining, agriculture, forestry, construction, transportation or other applications.

As shown in the exemplary embodiment of FIG. 1, the machine 100 may include a front portion 102 and a rear portion 104. The front portion 102 may include a front frame section 106, a cabin 116, front ground engaging members 108, and a first implement assembly 110. The cabin 116 is supported on the front frame section 106 while the front ground engaging members 108 are rotatably coupled to the front frame section 106. The first implement assembly 110 may include for e.g., a blade (as shown) or other appropriate attachments and may be pivotally connected to the front frame section 106 for working a ground surface.

The rear portion 104 may include a rear frame section 112, rear ground engaging members 114, an engine 118, and one or more drive train components (not shown). The rear ground engaging members 114 are rotatably coupled to the rear frame section 112. In the illustrated embodiment of FIG. 1, the front and rear ground engaging members 108, 114 are shown as wheels. However, in other embodiments, track assemblies or other structures commonly known to one skilled in the art may be used in lieu of the wheels to form the front and/or rear ground engaging members 108, 114 of the present disclosure. Therefore, a type of ground engaging members disclosed herein is merely exemplary in nature and hence, non-limiting of this disclosure. Any type of ground engaging members may be used depending on a type of machine used and specific requirements of an application.

The cabin 116 includes a cabin frame 120 that allows an operator of the machine 100 to enter the cabin 116. As such, the cabin frame 120 is suitably shaped and sized to facilitate entry and exit of the operator into the cabin 116. The machine 100 further includes a door system 122 that is coupled to the cabin frame 120 via suitable couplings 124 for e.g., hinges as shown in FIG. 1. The door system 122 includes a window 126, and a door frame 128 surrounding the window 126. The window 126 may be secured to the door frame 128 with the help of a window 126 gasket (not shown). The window 126 may have a planar surface. Moreover, the window 126 may be beneficially formed from a transparent material (for e.g., glass, clear plastic, and the like) to allow a view of the environment to the operator of the machine 100. However, in other embodiments, the window 126 may be formed from translucent or opaque materials depending upon specific requirements of an application. For example, the window 126 may be formed from a sheet metal blank that is configured to offer opacity and restrict of a view of the environment in which the machine 100 is operating. Therefore, a type and nature/opacity of the window 126 is merely exemplary in nature and hence, non-limiting of this disclosure. Any type and/or nature/opacity of the window 126 may be implemented without deviating from the spirit of the present disclosure.

Figure 2:
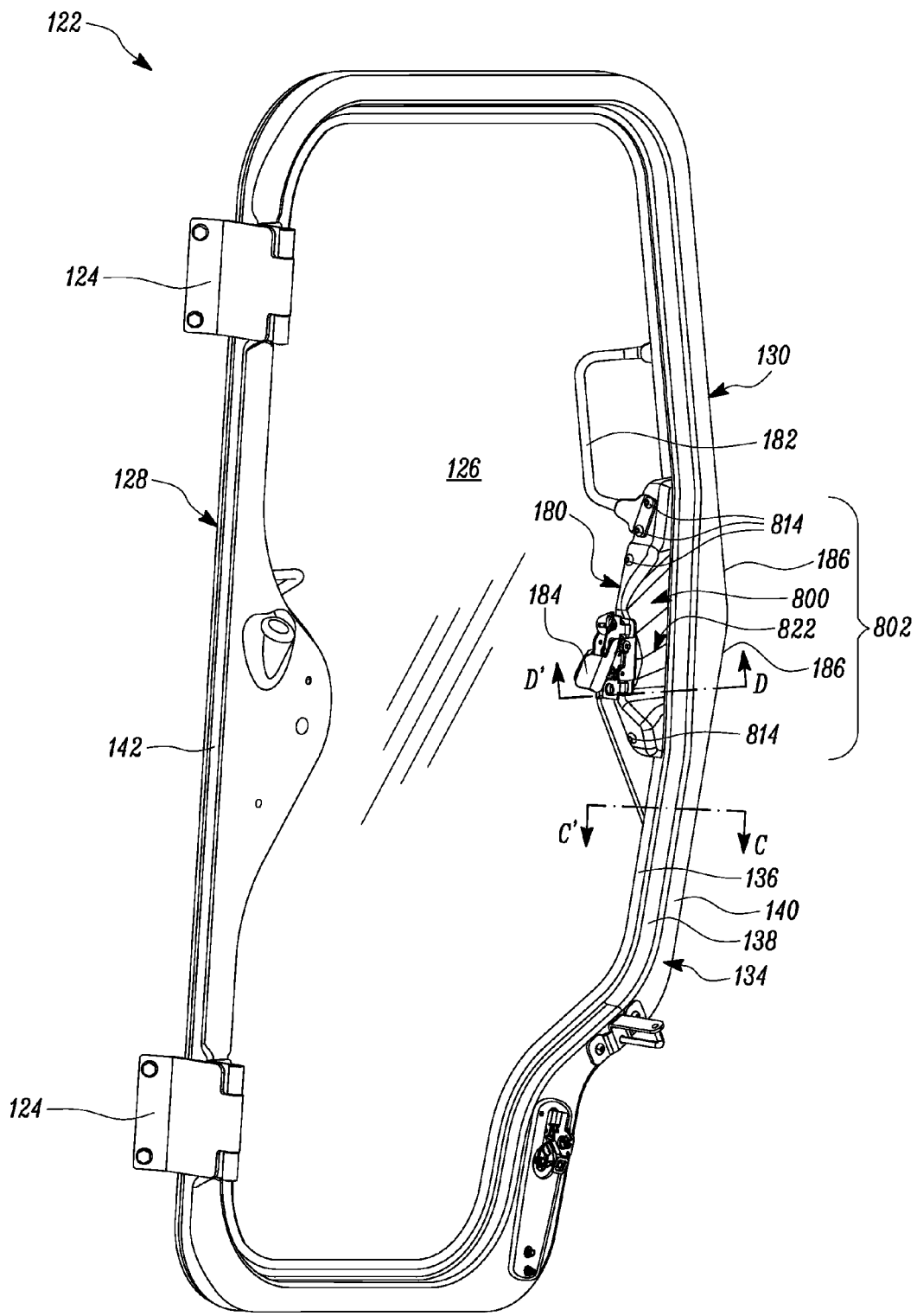
FIG. 2 is a front perspective view of the door system, according to an embodiment of the present disclosure.
Figure 3:
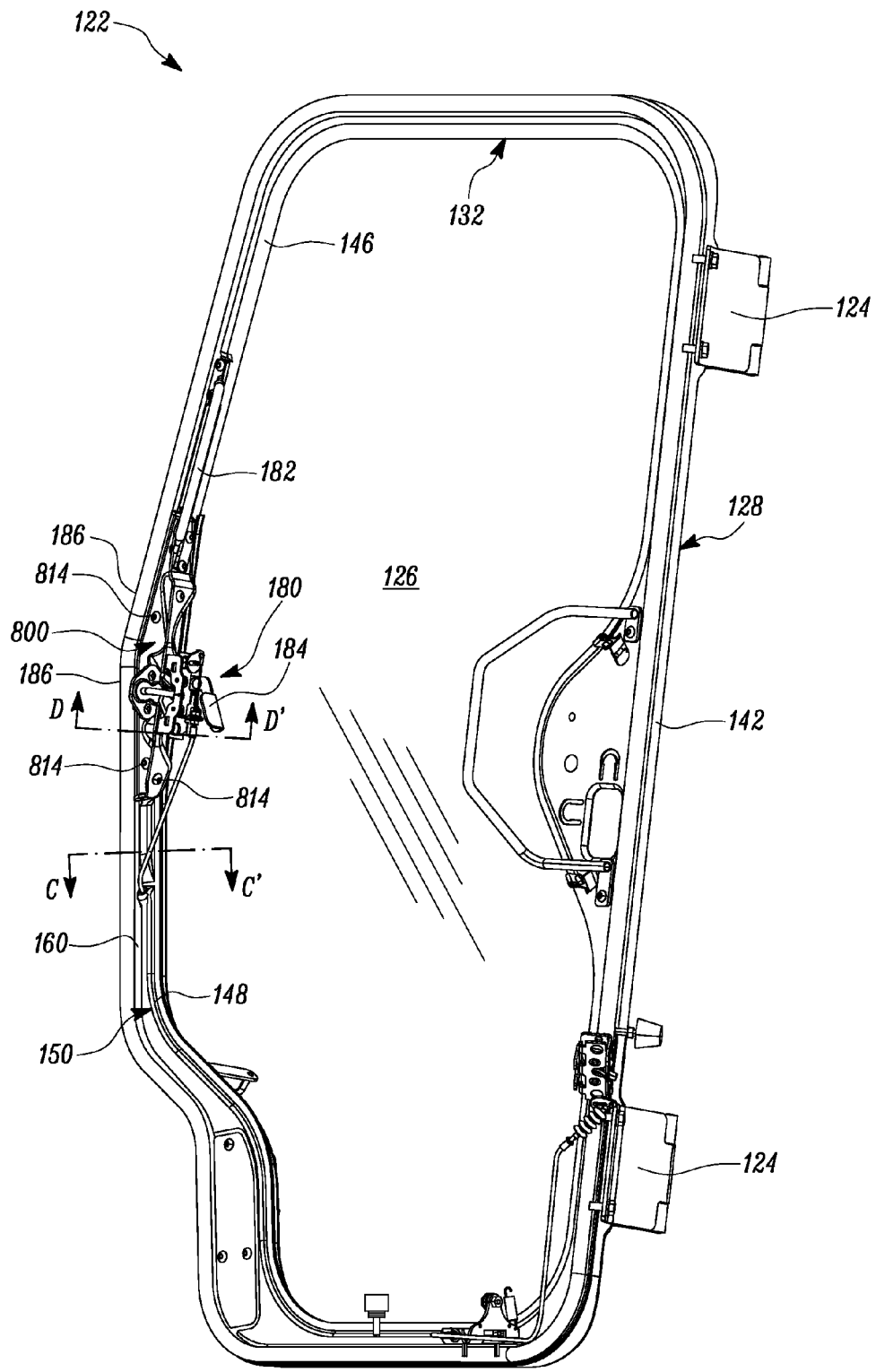
FIG. 3 is a rear perspective view of the door system, according to an embodiment of the present disclosure.
Figure 4:
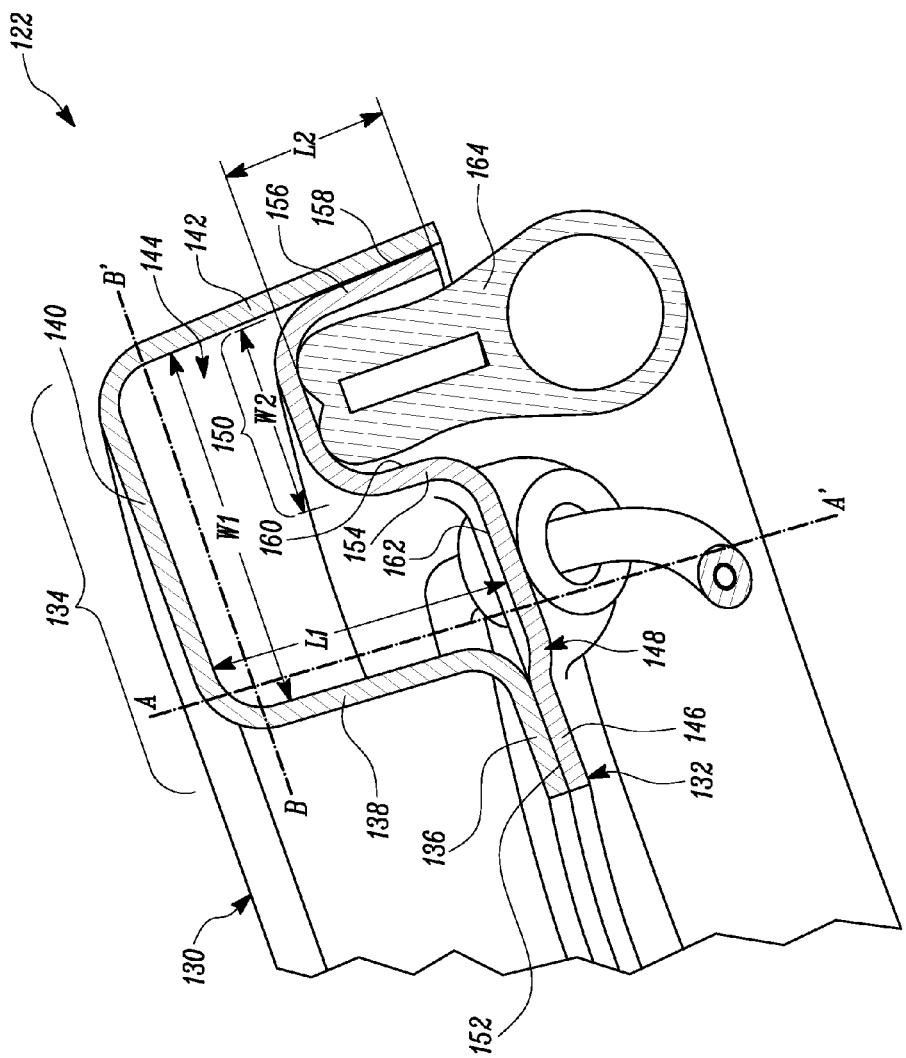
FIG. 4 is a cross-sectional view of the door system taken along section line C-C' of FIG. 3, according to one embodiment of the present disclosure.

Referring to FIGS. 2 and 3, a front perspective view and a rear perspective view of the door system 122 is illustrated. Further, referring to FIG. 4, a cross-sectional view of the door system 122 taken along section line C-C' of FIG. 3 is shown in accordance with an embodiment of the present disclosure. Furthermore, referring to FIG. 5, a cross-sectional view of the door system 122 taken from FIG. 4 is illustrated. Moreover, referring to FIG. 6, a cross-sectional view of the door system 122 taken along section line D-D' of FIG. 3 is shown in accordance with another embodiment of the present disclosure and FIG. 7 illustrates a cross-sectional view of the door system 122 taken from FIG. 6.

While the following detailed description and drawings are made with reference to a door system 122 of a motor grader, the teachings of this disclosure may be employed on other earth moving, construction, material handling or mining vehicles in which a door system 122 is coupled to the cabin frame 120 of such vehicles.

Figure 5:
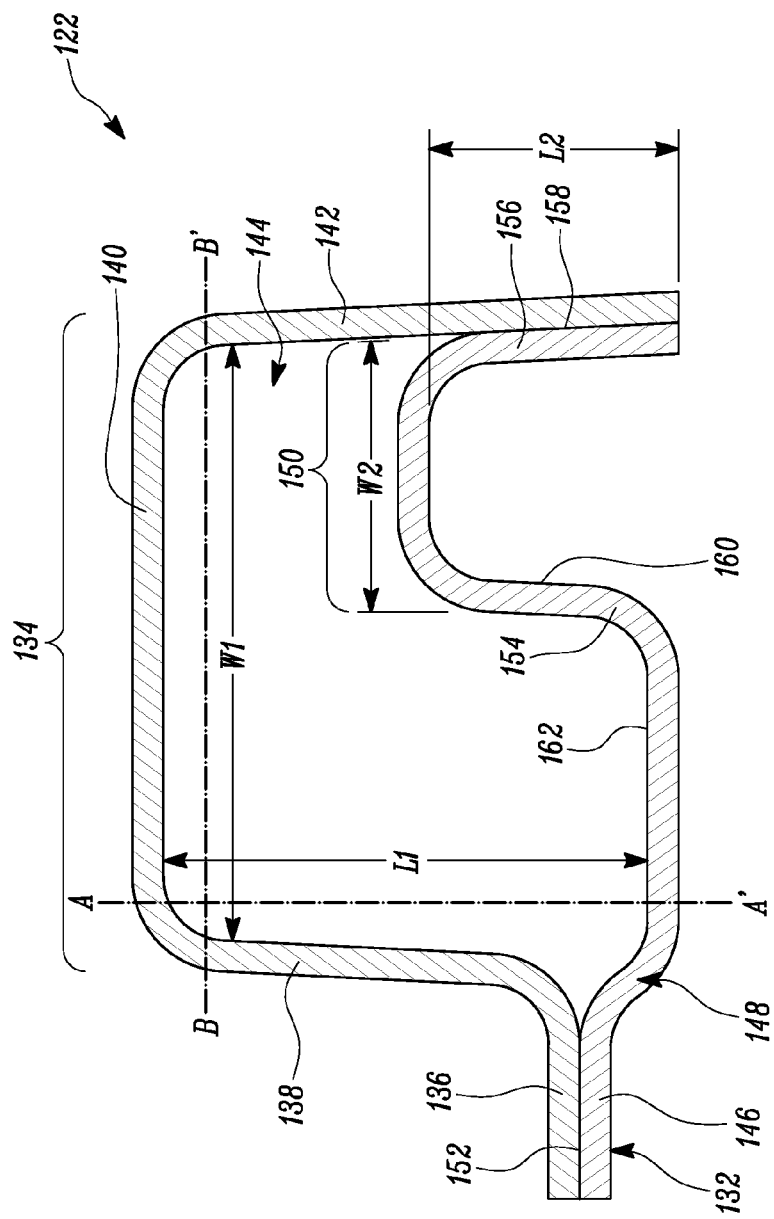
FIG. 5 is a cross-sectional view of a first panel and a second panel of the door system taken from FIG. 4.

Referring to FIGS. 2-5, the door frame 128 includes a first panel 130 and a second panel 132 that is coupled to the first panel 130 (as best shown in FIGS. 4 and 5). The first panel 130 includes a first outer portion 134 and a second outer portion 136 that is coupled to the first outer portion 134. In the illustrated embodiment of FIGS. 4 and 5, the first outer portion 134 and the second outer portion 136 are integral to each other so as to impart a unitary construction to the first panel 130. However, in an alternative embodiment, the first outer portion 134 and the second outer portion 136 may be separate components that are mutually joined to form the first panel 130.

Further, the first outer portion 134 has a first outer leg 138, an intermediate portion 140, and a second outer leg 142 that together define a cavity 144 therebetween. The first outer portion 134 is configured to have a U-shape with a width W1 about a first axis A-A'. The first outer leg 138 is disposed closer in proximity to the window 126 than the second outer leg 142 (See FIGS. 2 and 3). The second outer portion 136 extends from the first outer leg 138 toward the window 126 and about a second axis B-B' that is perpendicular to the first axis A-A'.

The second panel 132 has a first inner portion 146, a lip portion 148, and a second inner portion 150 that are coupled to one another. In the illustrated embodiment of FIGS. 4 and 5, the first inner portion 146, the lip portion 148, and the second inner portion 150 are integral to each other so as to impart a unitary construction to the second panel 132 i.e., the lip portion 148 is configured to extend between the first inner portion 146 and the second inner portion 150. However, in an alternative embodiment, the first inner portion 146, the lip portion 148, and the second inner portion 150 may be formed from separate components that are mutually joined to form the second panel 132.

The first inner portion 146 of the second panel 132 is joined to the second outer portion 136 of the first panel 130 at a first coupling 152. As shown, the first coupling 152 extends about the second axis B-B'. In order to form the first coupling 152, the first inner portion 146 of the second panel 132 and the second outer portion 136 of the first panel 130 may be bonded by adhesion, welding or other methods commonly known to one skilled in the art. The bonding between the first inner portion 146 of the second panel 132 and the second outer portion 136 of the first panel 130 may be of adequate strength to resist separation of the first panel 130 from the second panel 132 and vice-versa.

The second inner portion 150 has a first inner leg 154 that extends from the lip portion 148, and a second inner leg 156 that is coupled to the second outer leg 142 of the first panel 130 at a second coupling 158. As shown, the second coupling 158 extends in a direction substantially about the first axis A-A'. In order to form the second coupling 158, the second inner leg 156 of the second panel 132 and the second outer leg 142 of the first panel 130 may be bonded by adhesion, welding or other methods commonly known to one skilled in the art. As is the case with the first coupling 152, the second coupling 158 is also imparted with adequate strength to resist separation between the first panel 130 and the second panel 132.

Furthermore, with continued reference to FIGS. 4 and 5, the first inner leg 154 and the second inner leg 156 together define a seal channel wall 160 that extends within the cavity 144. The door system 122 further includes a sealing member 164 that is disposed within the seal channel wall 160. Moreover, the seal channel wall 160 may extend in a direction towards the intermediate portion 140 of the first panel 130. In the illustrated embodiment, the seal channel wall 160 has a U-shape. As such, the first inner leg 154 and the second inner leg 156 are parallel to the first axis A-A' and spaced apart from each other. The seal channel wall 160 has a length L2 along the second axis B-B' that is less than a length L1 of the cavity 144. Further, a width W2 of the seal channel about the first axis A-A' is also less than the width W1 of the cavity 144.

Although a U-shaped seal channel wall 160 is disclosed herein, in other embodiment, the first inner leg 154 and the second inner leg 156 may together define other shapes for the seal channel wall 160 such as, for e.g., but not limited to, a V-shape. Therefore, it may be noted that a shape of the seal channel wall 160, as defined by the first inner leg 154 and the second inner leg 156, may vary depending upon specific requirements of an application.

Moreover, as shown in the illustrated embodiment of FIGS. 4 and 5, the lip portion 148 of the second panel 132 includes an offset portion 162 that is configured to extend away from the second axis B-B' and in a direction opposite to the direction of the seal channel wall 160.

In the illustrated embodiment of FIGS. 4 and 5, the presence of the offset portion 162 in the second panel 132 increases the width W1 of the cavity 144 measured along the first axis A-A'. Therefore, an aspect ratio i.e., W1:L1 of the cavity 144 is increased by the presence of the offset portion 162 in the second panel 132. Alternatively, in another embodiment of the present disclosure, the lip portion 148 may be configured to axially extend from the first inner portion 146 to the second inner portion 150 i.e., the first inner leg 154 of the second inner portion 150. In this embodiment, the aspect ratio W1:L1 of the cavity 144 may be smaller than that illustrated in the embodiments of FIGS. 4 and 5. Therefore, an aspect ratio W1:L1 of the cavity 144 can be varied vis-à-vis the offset portion 162 of the second panel 132.

It is hereby envisioned that a larger aspect ratio of the cavity 144 provides for a higher resistance of the first and second panels 130, 132 to twisting moments encountered from latching or unlatching of the door frame 128 from the cabin frame 120. However, it may be noted that the aspect ratios W1:L1 disclosed herein are non-limiting of this disclosure. The aspect ratio W1:L1 of the cavity 144 may be suitably selected depending on various factors such as, but not limited to, space constraints, strength required in the door frame 128, and other specific requirements of an application.

Figure 6:
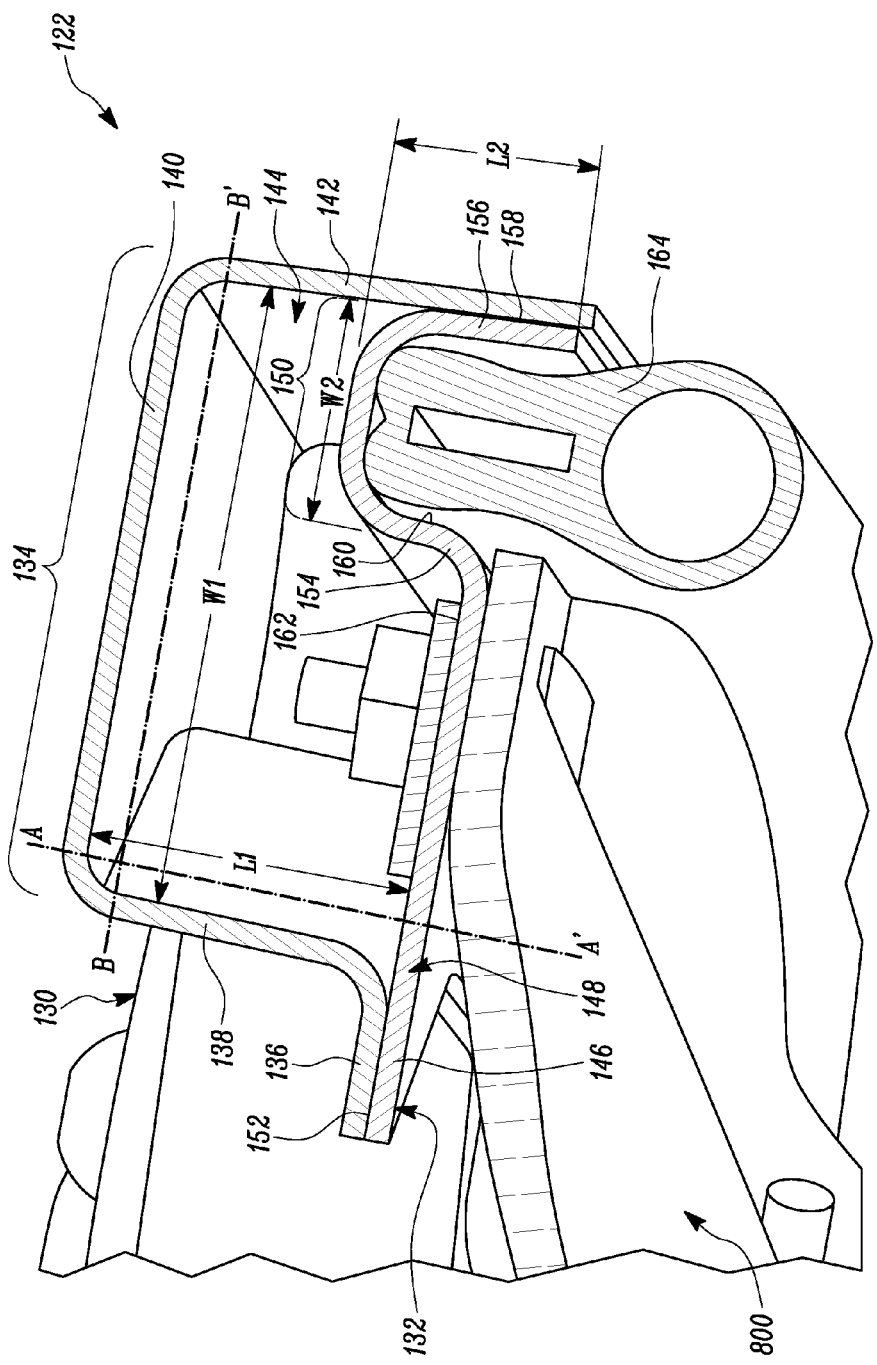
FIG. 6 is a cross-sectional view of the door system taken along section line D-D' of FIG. 2, according to another embodiment of the present disclosure.
Figure 7:
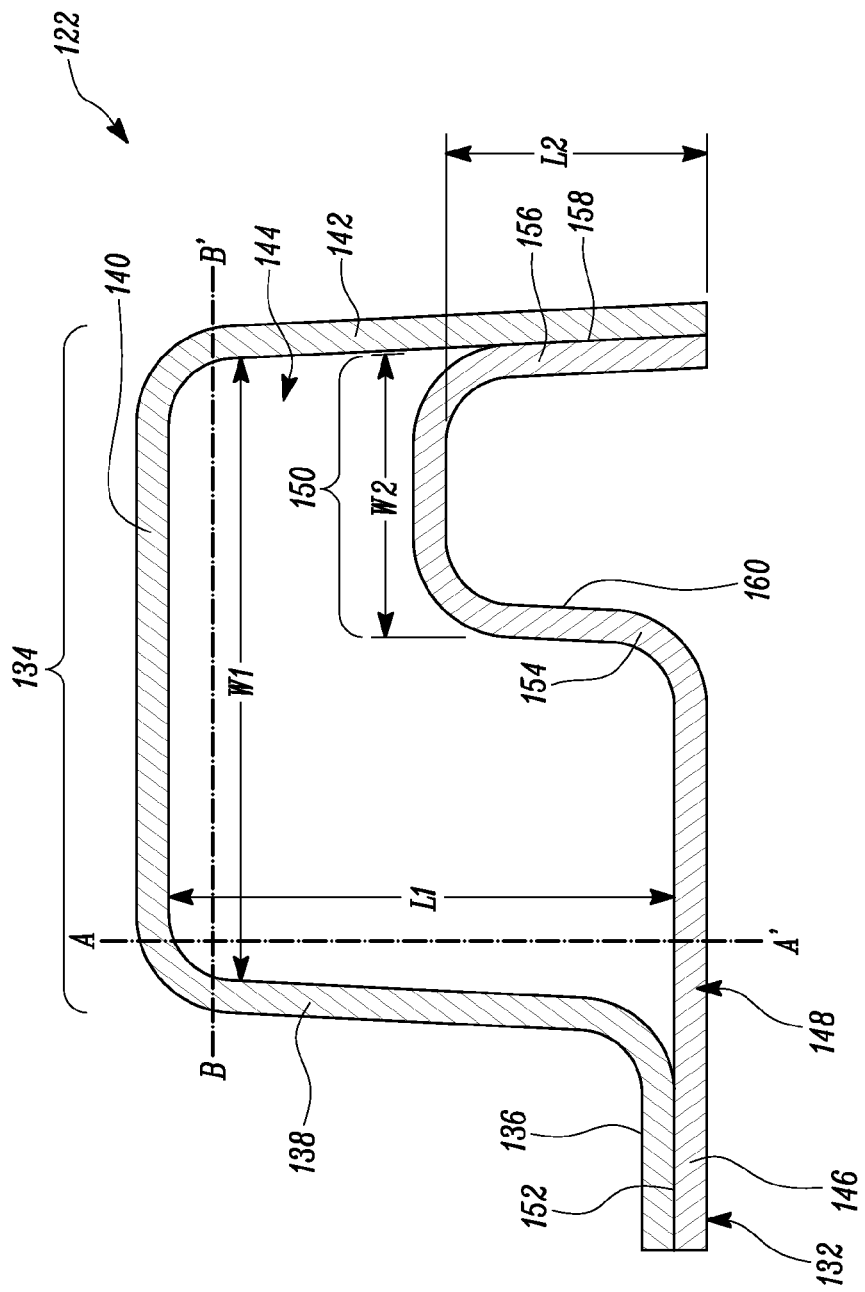
FIG. 7 is a cross-sectional view of a first panel and a second panel of the door system taken from FIG. 6.

Referring to FIGS. 2, 3, and 6, the door system 122 further includes a latch assembly 180. The latch assembly 180 includes a latch bracket 800 (shown in FIG. 8) that is coupled to the door frame 128 (See FIGS. 2 and 3). More specifically, the latch bracket 800 may be attached at an intermediate region 802 to the second panel 132 of the door frame 128.

Figure 8:
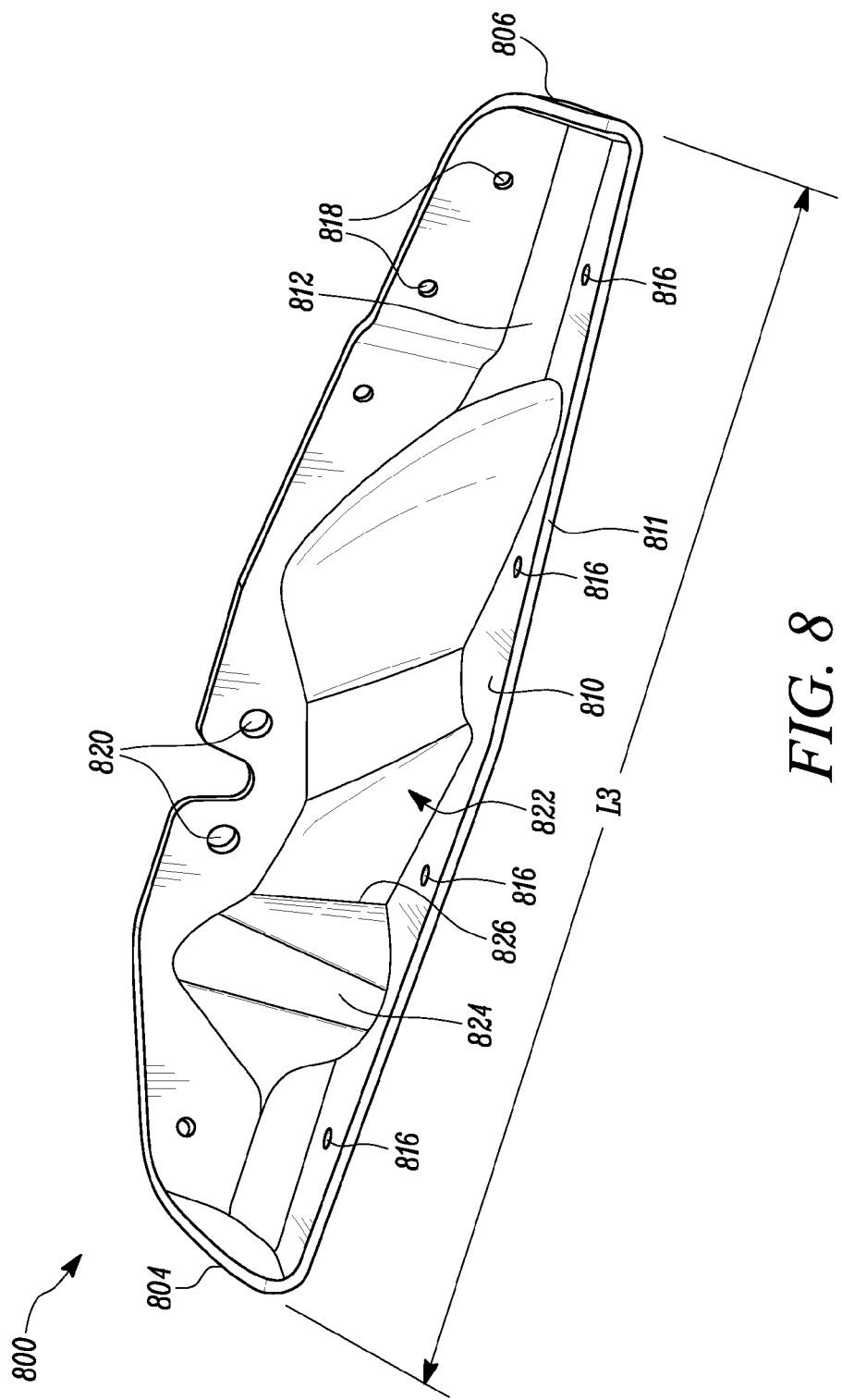
FIG. 8 is a perspective view of a latch bracket employed by the door system, in accordance with an embodiment of the present disclosure.

As shown in FIG. 8, the latch bracket 800 has a first end 804, a second end 806, and a base portion 810 extending between the first end 804 and the second end 806. Moreover, the base portion 810 may include a base edge. The latch bracket 800 also includes a sidewall 812 extending angularly from the base portion 810.

Referring to FIGS. 2 and 3, the base portion 810 of the latch bracket 800 may be disposed on the first inner portion 146 of the second panel 132. Further, the latch bracket 800 may be coupled to the second outer portion 136 of the first panel 130 and the first inner portion 146 of the second panel 132 using fasteners 814. In the illustrated embodiment, the base portion 810 of the latch bracket 800 defines a first plurality of holes 816 adjacent to the base edge. Each of the first plurality of holes 816 is configured to receive the fasteners 814 therethrough (See FIGS. 2 and 3).

Referring to FIGS. 1, 2, 3, 6, and 8, the sidewall 812 of the latch bracket 800 is configured to face an interior of the cabin 116 when the door is in the closed position. The sidewall 812 defines a second plurality of holes 818 and a third plurality of holes 820. The latch bracket 800 may be coupled to a handle 182 through fasteners 814 passing through the second plurality of holes 818. The latch bracket 800 may be coupled to a latch member 184 (See FIG. 3) via fasteners 814 passing through the third plurality of holes 820. Moreover, in an embodiment as shown in FIG. 2, the second outer leg 142 of the first panel 130 has two slanted sides 186 located in the vicinity of the latch bracket 800. The slanted sides 186 are configured to converge distally away from the first outer leg 138.

The latch bracket 800 may include a ridge formation 822 disposed partway along a length L3 of the base portion 810. The ridge formation 822 extends from the sidewall 812 to the base portion 810 of the latch bracket 800. As shown in FIG. 8, a contour of the ridge formation 822 includes a plurality of crests 824 and troughs 826 alternating with each other.

Various embodiments disclosed herein are to be taken in the illustrative and explanatory sense, and should in no way be construed as unduly limiting of the present disclosure. All directional references (e.g., above, below, upper, lower, top, bottom, vertical, horizontal, inward, outward, radial, upward, downward, left, right, leftward, rightward, clockwise, and counter-clockwise) are only used for identification purposes to aid the reader's understanding of the present disclosure, and may not create limitations, particularly as to the position, orientation, or use of the systems and/or methods disclosed herein. Joinder references (e.g., attached, affixed, coupled, engaged, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The door system 122 of the present disclosure has applicability in resisting twisting moments encountered during latching of a door frame to a cabin frame of a machine.

In an aspect of the present disclosure, the increased aspect ratio i.e., W1:L1 of the cavity 144 disclosed herein provides for better resistance to twisting moments in the door frame 128. Moreover, the configuration of the first and second panels 130, 132 disclosed herein imparts strength to the door frame 128 thereby preventing the door frame 128 from going out of shape under repeated loading and unloading cycles of the door frame 128 i.e., repeated latching and unlatching of the door frame 128 from the cabin frame 120.

Moreover, the ridge formation 822 present on the latch bracket 800 provides added strength to the latch bracket 800 in absorbing loads encountered during latching and unlatching of the door frame 128 relative to the cabin frame 120. Hence, the ridge formation 822 may help transfer the operational loads from the latch bracket 800 into the fasteners 814. Therefore, the configuration of the door frame 128 and the configuration of the latch bracket 800 may allow manufacturers to manufacture door systems using lesser grade or lightweight materials, thereby offsetting weight and costs previously incurred in manufacturing door systems.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A door system for a machine, the door system comprising:
   a window; and
   a door frame surrounding the window, the door frame including a first panel and a second panel coupled to the first panel,
   the first panel including a first outer portion and a second outer portion coupled to the first outer portion, the first outer portion having a first outer leg, an intermediate portion, and a second outer leg together defining a cavity having a U-shape with a width about a first axis, the first outer leg disposed closer in proximity to the window than the second outer leg, the second outer portion extending from the first outer leg toward the window about a second axis that is perpendicular to the first axis; and
   the second panel having a first inner portion, a lip portion and a second inner portion coupled to one another, the first inner portion joined to the second outer portion of the first panel at a first coupling, the first coupling extending about the second axis, the second inner portion having a first inner leg and a second inner leg together defining a seal channel wall that extends within the cavity, the first inner leg extending from the lip portion, the second inner leg coupled to the second outer leg of the first panel at a second coupling in a direction substantially about the first axis,
   wherein the lip portion includes an offset portion configured to extend away from the second axis and in a direction opposite to an extension direction of the seal channel wall.

2. The door system of claim 1, wherein the first outer leg and the second outer leg of the first panel are substantially parallel to the first axis.

3. The door system of claim 1, wherein the seal channel wall has a substantially U-shape.

4. The door system of claim 1 further comprising a latch bracket coupled to the door frame.

5. The door system of claim 4, wherein the second outer leg of the first panel has two slanted sides located in the vicinity of the latch bracket, wherein the slanted sides are converging distally away from the first outer leg.

6. The door system of claim 5, wherein each of the slanted sides subtends an acute angle with the first outer leg.

7. The door system of claim 5, wherein the latch bracket is coupled to the second outer portion of the first panel and the first inner portion of the second panel with a plurality of fasteners.

8. The door system of claim 7, wherein a contour of the latch bracket comprises at least one ridge formation, wherein the ridge formations are configured to distribute a load on the latch bracket to the plurality of fasteners.

9. The door system of claim 1 further comprising a sealing member disposed within the seal channel wall.

10. A door system for a machine, the door system comprising:
    a door frame including a first panel and a second panel coupled to the first panel,
       the first panel including a first outer portion and a second outer portion coupled to the first outer portion, the first outer portion having a first outer leg, an intermediate portion, and a second outer leg together defining a cavity having a U-shape with a width about a first axis, the first outer leg disposed closer in proximity to the window than the second outer leg, the second outer portion extending from the first outer leg toward the window about a second axis that is perpendicular to the first axis; and
       the second panel having a first inner portion, a lip portion and a second inner portion coupled to one another, the first inner portion joined to the second outer portion of the first panel at a first coupling, the first coupling extending about the second axis, the second inner portion having a first inner leg and a second inner leg together defining a seal channel wall that extends within the cavity, the first inner leg extending from the lip portion, the second inner leg coupled to the second outer leg of the first outer portion at a second coupling in a direction substantially about the first axis; and
    a latch bracket coupled to the door frame, wherein the second outer leg of the first outer portion of the first panel has two slanted sides located in the vicinity of the latch bracket, and wherein the slanted sides are converging distally from the first outer leg.

11. The door system of claim 10, wherein each of the slanted sides subtends acute angle with the first outer leg.

12. The door system of claim 10, wherein the latch bracket is coupled to the second outer portion of the first panel and the first inner portion of the second panel with a plurality of fasteners.

13. The door system of claim 12, wherein a contour of the latch bracket comprises at least one ridge formation, wherein the ridge formations are configured to distribute a load on the latch bracket to the plurality of fasteners.

14. The door system of claim 10, wherein the first outer leg and the second outer leg are substantially parallel to each other in regions excluding an intermediate region of the door frame.

15. The door system of claim 10, wherein the lip portion of the second panel extends from the first inner portion along the second axis.

16. The door system of claim 10, wherein the lip portion includes an offset portion extending away from the second axis in a direction opposite the direction of the seal channel wall.

17. A machine comprising:
    a cabin having a cabin frame;
    a door system coupled to the cabin frame; the door system comprising:
       a window; and
       a door frame surrounding the window, the door frame including a first panel and a second panel coupled to the first panel,
       the first panel including a first outer portion and a second outer portion coupled to the first outer portion, the first outer portion having a first outer leg, an intermediate portion, and a second outer leg together defining a cavity having a U-shape with a width about a first axis, the first outer leg disposed closer in proximity to the window than the second outer leg, the second outer portion extending from the first outer leg toward the window about a second axis that is perpendicular to the first axis; and
       the second panel having a first inner portion, a lip portion and a second inner portion coupled to one another, the first inner portion joined to the second outer portion of the first panel at a first coupling, the first coupling extending about the second axis, the second inner portion having a first inner leg and a second inner leg together defining a seal channel wall that extends within the cavity, the first inner leg extending from the lip portion, the second inner leg coupled to the second outer leg of the first outer portion at a second coupling in a direction substantially about the first axis.

18. The machine of claim 17, wherein the lip portion of the second panel extends from the first inner portion along the second axis.

19. The machine of claim 17, wherein the lip portion includes an offset portion extending away from the second axis in a direction opposite the direction of the seal channel wall.

20. The machine of claim 17 further comprising a latch bracket coupled to the door frame, wherein the second outer leg of the first outer portion of the first panel has two slanted sides in the vicinity of the latch bracket, wherein the slanted sides are converging distally from the first outer leg.

\* \* \* \* \*